Feb. 6, 1934.　　　　H. ROSENTHAL　　　　1,946,293
MEANS OF POWER TRANSMISSION
Filed Dec. 19, 1930　　　3 Sheets-Sheet 2

INVENTOR

Patented Feb. 6, 1934

1,946,293

UNITED STATES PATENT OFFICE 1,946,293

MEANS OF POWER TRANSMISSION

Henry Rosenthal, New York, N. Y.

Application December 19, 1930
Serial No. 503,458

25 Claims. (Cl. 290—17)

My invention relates to means and methods of power transmission and more particularly to an improvement in means and method of transmitting power from the prime mover to the driving wheels in automotive equipment. However, I do not limit my invention to this use and neither do I limit it to any particular type of engine, as any prime mover may be used.

It is well known that higher efficiency is usually attained when operating an engine at or near full load than when such engine is lightly loaded. One of the objects of my invention is to provide means whereby the engine will be operated at or near full load for the greater part of the time that it is in use. What I mean herein by "full load" is the maximum steady output of the engine at any given speed. It may be the case that "full load" as described above, is a higher load than that at which the engine will deliver energy with the greatest economy. If this were the case it may be desirable to interpose in the system a throttle which would limit the maximum steady output of the engine at any given speed to that at which the engine operates at approximately maximum economy. Under this condition the "economic load" would become the "full load", as described above, and as used in this invention. My system may be operated all of the time at "full load" of the engine or at "economic load" or part of the time at "full load" and part of the time at the "economic load" or vice versa.

By means of my invention, the prime mover can be operated at or near full load and will automatically adjust itself to variations in applied load. My invention consists in means and method of automatically regulating the speed of the prime mover by means of the torque and horsepower of the applied load on the driving motors so as to maintain substantially full load on the prime mover.

The present invention deals with an electrical transmission adapted to the use of series motors as propelling means but is not limited to this adaptation, as it is equally suitable to other adaptations. The development of electric drive has followed the practice of the electric street car and thus has used the series motor which in itself has characteristics desirable for street car use. While these characteristics are not necessary for traction work where the electric power is not generated by and transmitted from a central power house, still the wide use of series motors for traction service makes it desirable to utilize this form of motor as its use in this field has already been established.

My invention depends on its operation on the controlling of the speed of the prime mover by controlling the counter torque which opposes the revolution of the prime mover. This is accomplished by providing a relay, one element of which comprises two co-acting coils one of which coils carries current proportional to the armature current of the generator whose torque opposes the rotational movement of the prime mover while the other coil carries current proportional to the current in the main field of this generator. Thus the action of these two coils on each other is substantially proportional to the torque of the generator, and by utilizing this relay to control the main field of the generator, the torque of the generator can be maintained at any predetermined value. If the co-action of the two relay coils is balanced by a substantially constant force, the torque of the generator will remain substantially constant except for means provided to prevent such constancy. I provide such means either by an opposing series field on the generator or by proper additional coil or coils on the relay whereby the torque of the generator may be reduced as its armature current is increased due to an increase in load on the driving motors. This permits of an increase in speed of the prime mover as the load on the driving motor increases.

My invention is shown in the accompanying drawings in several modifications, but I do not limit my invention to the forms shown. My invention will better be understood by reading the following specification taken with the attached drawings forming a part thereof, and in which Figure 1 shows schematically the essentials of one embodiment of my invention.

Figure 1:
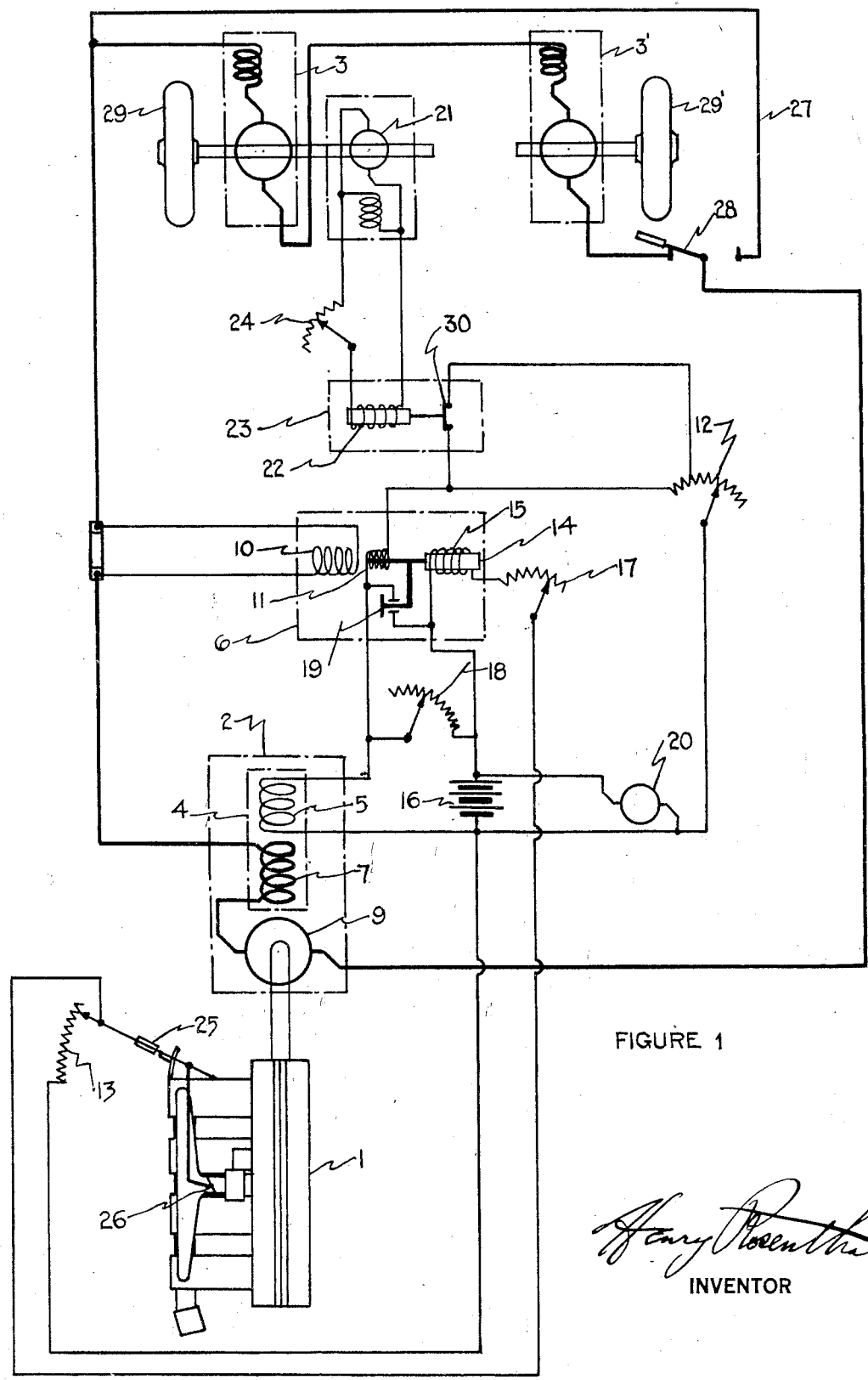

Referring to Figure 1, the prime mover 1 is connected by any suitable means to an electric generator 2, whereby the torque and horsepower developed by the prime mover are transmitted to the generator. Electric motors 3 and 3' are connected electrically to the generator and by suitable means to the apparatus to be driven, as shown in this case the wheels 29 and 29' of a vehicle (not shown).

The main generator 2 is for direct current, with a differential compound field 4. A portion 5 of the field 4 is adapted for separate excitation. The other portion 7 of this field is excited by means of the current flowing through the generator armature 9, and is so wound and connected as to oppose the field of the portion 5. The current in the separately excited field portion 5 is controlled by the relay 6.

In relay 6, coil 10 carries a current proportional to the current in the generator armature 9.

Coil 10 co-acts with coil 11 to produce a force to lift the relay 6. Coil 11 carries a current proportional to the current in the separately excited portion 5 of the field 6 of the generator 2. I prefer to obtain this proportionality of current by connecting the coil 11 directly across the field portion 5, but preferably through the adjustable resistance 12. Coil 11 is relatively movable with respect to coil 10, coil 10 being fixed to the relay base.

The force produced by the action of coil 10 reacting on coil 11 tends to move the relay in one direction and this action is opposed by the force of the coil 15 acting on the armature 14. Coil 15 may be energized by connecting it across the battery 16 with the energizing current controlled by the adjustable resistances 13 and 17. In this way a constant but adjustable force is obtained to oppose the force of coil 10 co-acting with coil 11.

Current for field portion 5 is obtained from battery 16 through adjustable resistance 18 which is adapted to be short-circuited by the contacts 19 of relay 6. The battery 16 may be charged by the generator 20 which should furnish substantially constant potential and which may be driven by any suitable means. Other sources of electricity may be substituted for the battery 16 without departing from the spirit of my invention.

Figure 2:
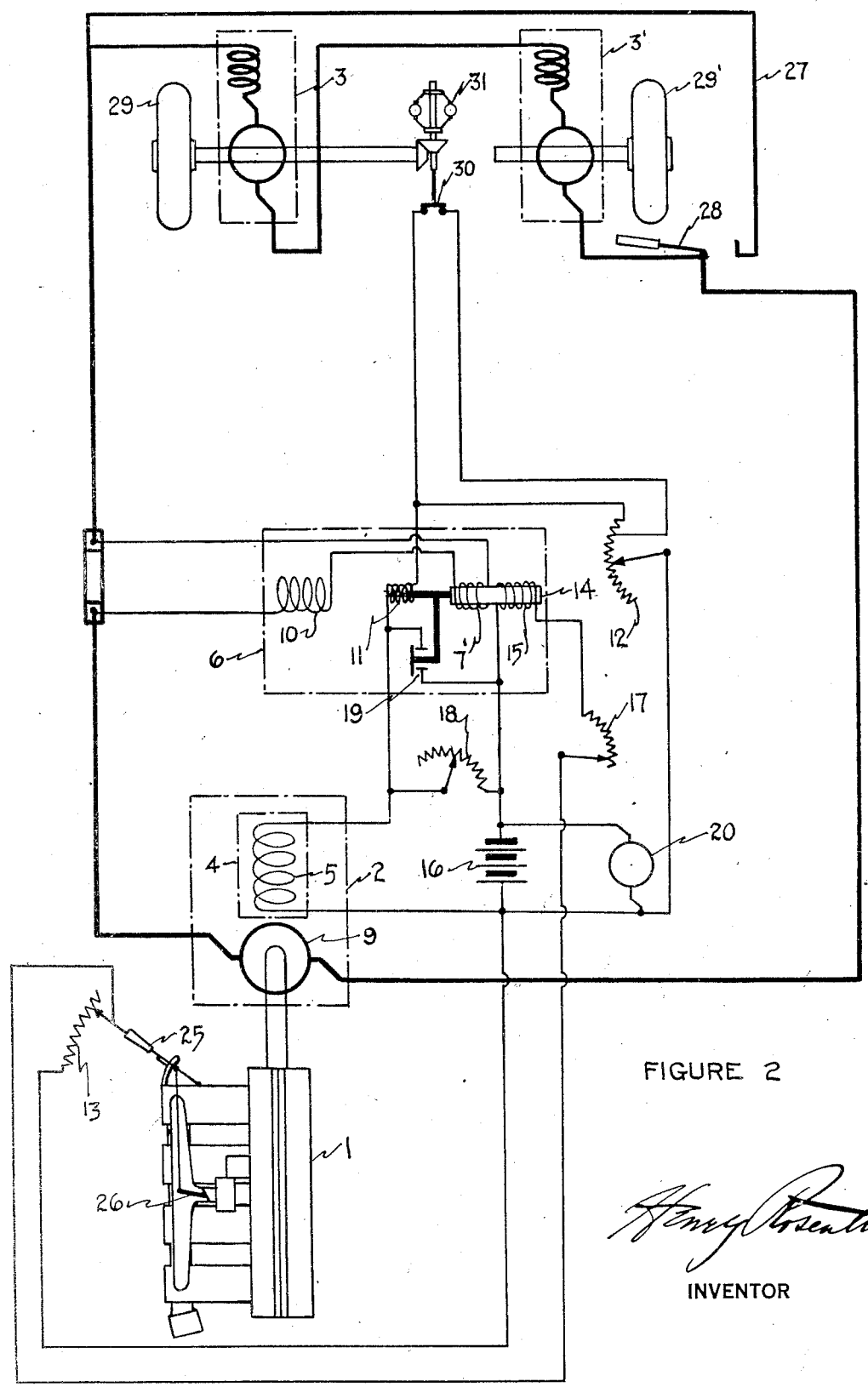
Figure 2 shows schematically a modified form of my invention.

The generator 21 operates at a speed proportional to the speed of the vehicle, and provides current to the coil 22 of the relay 23 through the adjustable resistance 24. With this connection the potential of the generator 21 will increase with increasing speed of the vehicle and at some predetermined speed of the vehicle the relay will act to open contacts 30 thus altering resistance 12 in series with coil 11 of relay 6. In place of generator 21 and relay 23, a direct acting governing device driven at a speed proportional to the speed of the vehicle may be used as a means of opening contacts 30. Such a modification is shown in Figure 2.

Two motors are shown in the illustration but I do not limit my invention to this number as any convenient number of motors may be used. Where a plurality of motors are employed any usual connection or connections may be employed.

The lever 25 is adapted to operate throttle 26 of the prime mover 1, as well as to adjust the resistance of the adjustable resistance 13. When the throttle is closed, the maximum amount of resistance 13 is in circuit and when the throttle is wide open resistance 13 is substantially out of circuit.

The connection 27 provides means for disconnecting motors 3 and 3' from the circuit without eliminating the action of relay 6. This connection 27 may be closed by throwing switch 28 to the right.

Having described the various connections as shown on the diagram, I will now describe the operation. In general the prime mover 1 supplies power to drive the generator 2 which in turn supplies electricity to the electric motors 3 and 3' which drive the vehicle. I prefer to operate with the throttle 25 in the wide open position with the speed of the prime mover governed by the counter torque of the generator 2.

The relay 6 acts to adjust the field portion 5 of the generator 2 so that, neglecting the action of the series portion 7 of the field, the torque of the generator remains at substantially a constant value. This value can be adjusted by controlling the adjustable resistance 17, so that the torque of the generator, considering all the inherent factors, balances the torque of the engine at any desired engine speed and load. With the vehicle operating under conditions to produce this load, the prime mover will assume this speed. Should the load on the motors be increased for any reason, such as encountering a more severe grade, a greater current will be required by the motors which in turn will cause relay 6 to act in such a manner as to decrease the field strength of the field portion 5. If no differential field were provided on the generator, its torque would remain constant; but with the differential field portion 7 carrying current proportional to the motor current, any increase in motor current causes a reduction in generator torque which in turn allows the speed of the prime mover to increase and to deliver the greater amount of power required by the load. With a decrease in the power required by the vehicle, the reverse action takes place.

If constant potential were supplied to a series motor, an increase in load would cause a decrease in motor speed, and consequently in vehicle speed. As the speed of the prime mover will increase and the field strength of the generator will decrease with an increase of load on the motors, the delivered voltage will be dependent on the relative changes in these two factors. The speed change of the vehicle will also be dependent upon these two factors as well as on the inherent characteristics of the motors. The relative change in field strength and engine speed depends upon the characteristics of the prime mover and, the relation between the portion 7 to the portion 5 (of the field 4 of generator 2,) which latter in turn depends upon the relation of the strength of coils 10 and 11 of relay 6. By adjusting resistance 12 the relation of the strength of these coils may be adjusted, and by proper setting of this resistance the vehicle can be made either to maintain substantially constant speed, or to approach the same variations in speed as would occur under the same variations in load with a constant potential supply, or intermediate values of speed changes may be made to occur.

It can be seen from the above that the speed of the vehicle is under substantial control without changing the position of the throttle 25 simply by adjusting resistance 12. This adjustment in vehicle speed may be used substantially whenever adjustment of the vehicle speed is desirable.

Resistor 13 is provided to furnish means for controlling the counter torque of the generator 2 so as to properly balance the torque of the prime mover at any throttle position and is preferably adjusted by the movement of the same lever as controls the position of the throttle. By providing the proper amount of resistance in this resistor 13, the engine can be made to idle with the throttle in substantially closed position with the motors connected in circuit but with insufficient current to cause their rotation. With the motors disconnected from the line relay 6 becomes inoperative unless the generator circuit is completed by a connection which is shown diagrammatically at 27 and which would be closed as shown in the diagram by throwing switch 28 to the right. If such a connection is provided, proper resistance may be placed in adjustable resistor 13 which acting on coil 15 of relay 6 will maintain the idling speed of engine (under this condition of connections) at any desired value. If no such connection as 27 is provided and it is desired to disconnect the motors from the circuit, the throttle will have to be adjusted to such an extent that the torque of the engine under throttled condition balances the friction of the rotating parts in the same manner as is commonly employed when gears are used to transmit the power from the prime mover to the vehicle.

Relay 23 is provided to limit the speed of the vehicle to some predetermined maximum value. When this predetermined value is reached, contacts 30 open and change the value of the resistance in series with relay coil 11 this acting to change the relationship of the values of coils 10 and 11 of relay 6, thus changing the relationship of the current in armature 9 and field 7 relative to the current in field 5 of the main generator 2. This acts in such a way as to reduce both the speed of the prime mover as well as the speed of the driving motors. It will be noted that this arrangement of preventing overspeed of the vehicle acts entirely independently of the throttle of the prime mover and hence does not in any way limit the amount of power which may be secured from the prime mover. This feature I believe is novel to my invention as well as are other of the features which I have described.

In Figure 2, a shunt generator is shown and the effect of the differential field 7 of Figure 1 in modifying the countertorque of the generator and so affecting the speed of the prime mover is obtained by placing coil 7' on relay 6. It will be seen from the diagram that this coil 7' carries current proportional to that in the armature 9 of generator 2. Coil 7' is wound differentially to coil 15 and by properly proportioning these two coils the same action can be obtained in effecting control of the system as may be obtained from the differential field 7 shown in Figure 1. In this modification the force produced by coil 10 reacting on coil 11 which tends to move the relay in one direction is opposed by the force produced by the combination of the two differentially wound coils 15 and 7' acting on the armature 14. By the use of this differential combination, the opposing or controlling force of the relay decreases as the load on the system increases, and the relay acts to so control the field of the generator 2 that the torque of the generator decreases as the system load increases.

If coil 7' as shown in Figure 2 were omitted and a coil 7'' carrying current proportional to the current in armature 9 of generator 2 were provided, similar results would ensue, provided coil 7'' were wound cumulative to coil 11 of the relay 6.

Also in Figure 2, a governor 31 is shown as replacing the generator 21 and relay 23 shown in Figure 1. In this case the action of limiting the vehicle speed is attained by the direct action of the governor 31 on contacts 30.

Further switch 28 is shown to short circuit motors 3 and 3' on its being thrown to the right, rather than to disconnect the motors as shown in Figure 1.

Figure 3:
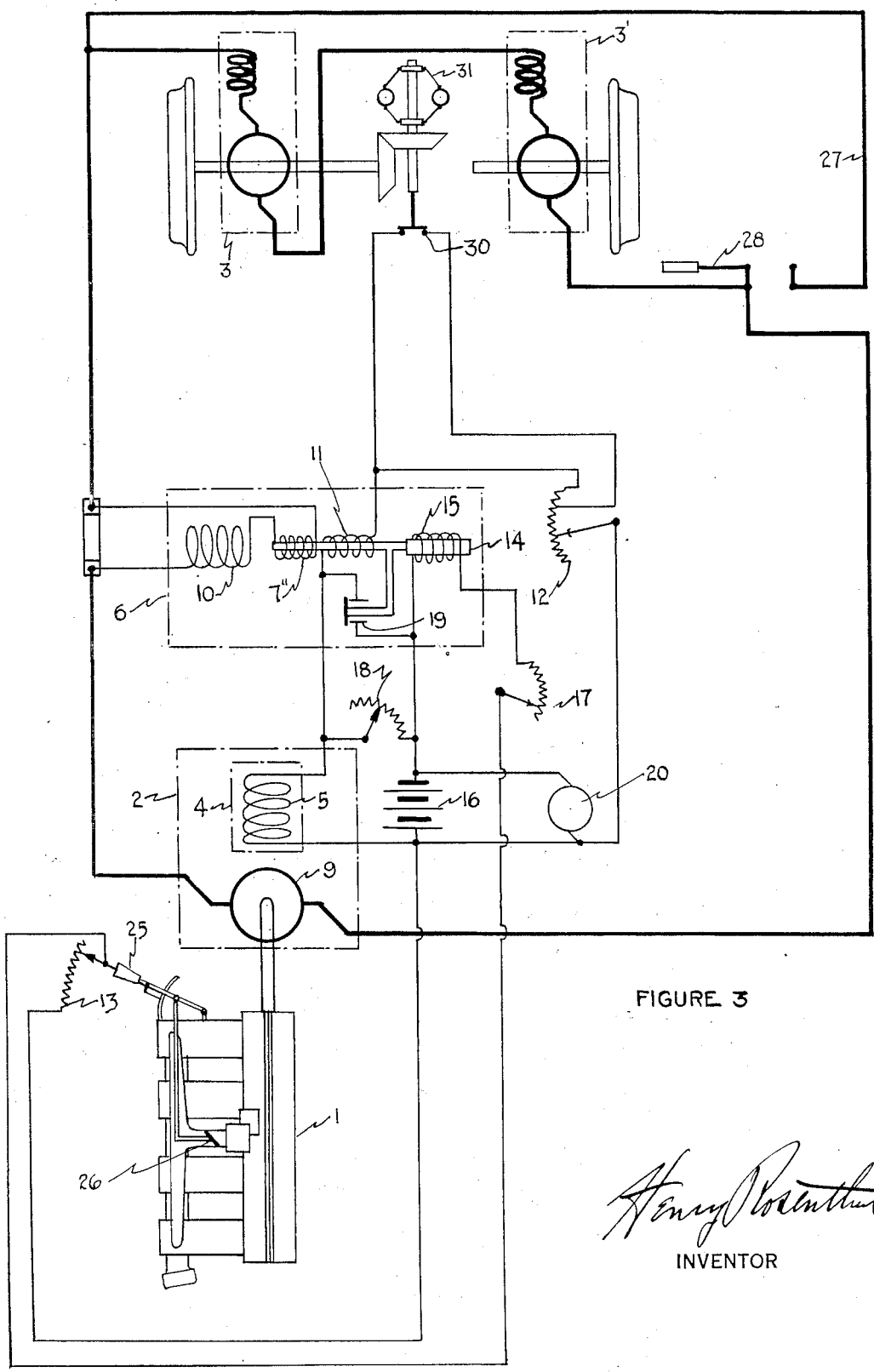
Figure 3 shows schematically a further modified form of my invention, in which a cumulative coil on the controlling relay serves to furnish the means for so modifying the torque of the generator that it is reduced as the armature current is increased.

In Figure 3, coil 7'' wound cumulative to coil 11 of relay 6 and carrying current proportional to the current in armature 9 of generator 2, acts in place of series field 7 (shown in Fig. 1) in so modifying the field strength of generator 2 that the torque of the generator decreases as the load increases.

As shown in Figure 3, coil 10 acts on the combined coils 11 and 7'' to produce the force to move the relay 6 in one direction and the action of these three coils constitute a relay element in which coils 11 and 7'' are relatively movable to coil 10. For any adjustment of the resistance 17, the relay 6 would regulate to provide constant torque on the generator if the action of 7'' is not considered. Coil 7'' acts to balance at a lower strength in coil 11 than if coil 7'' were omitted and therefore produces a lower torque value on the generator than if coil 7'' were omitted. As the strength of coil 7'' increases with increased load on the system, the relay controls the generator so as to produce decreasing value of generator torque as the system load increases.

Now having described my invention in a manner that is readily understandable by one skilled in the art, it is clear that many changes can be made without departing from the spirit of the invention.

I claim:

1. The combination of a prime mover, a driving member and an intermediate member functionally connecting the prime mover and driving member together, means distinct from and co-acting with the intermediate member responsive to changes in torque of the intermediate member and acting to adjust the torque of the intermediate member, and means connecting the prime mover and intermediate member together, whereby the changes in load on the driving member are transmitted to the prime mover and the speed of the prime mover thereby so adjusted that the changed load becomes substantially the full load of the prime mover at that speed.

2. In a drive system, the combination of a prime mover, a driving member subject to varying load conditions, intermediate means connecting the prime mover and driving member together, means distinct from and responsive to changes in torque of the intermediate member to adjust its torque and co-acting with the intermediate member whereby the intermediate member is responsive to the varying load conditions of the driving member, and acts to adjust the speed of the prime mover to that amount at which the full load of the prime mover at that speed corresponds to the instant load of the driving member.

3. The combination of a prime mover, a driving member and an intermediate member functionally connecting the prime mover and the driving member together, means distinct from and co-acting with the intermediate member and responsive to changes in torque of the intermediate member, whereby under changes in load on the driving member the speed of the prime mover is so adjusted that it increases with increased load on the driving member.

4. The combination of a prime mover, controlling means therefor, a driving member and an intermediate member functionally connecting the prime mover and the driving member together, means distinct from and responsive to changes in torque of the intermediate member and coacting with the intermediate member whereby the torque of intermediate member is adjusted on to changes in load of the driving member, and means connecting the prime mover and the intermediate member together whereby under changes in load the driving member maintains substantially constant speed and the speed of the prime mover is adjusted to that amount at which the load of the prime mover at any given setting of the controlling means corresponds to the load of the driving member.

5. The combination of a prime mover, controlling means therefor, a driving member and an intermediate member functionally connecting the prime mover and the driving member together separate metering means responsive to changes in load of the driving member and co-acting with the intermediate member to adjust the torque of the intermediate member and means connecting the prime mover and the intermediate member together whereby under changes in load the speed of the prime mover is adjusted to that amount at which the load of the prime mover at any given setting of the controlling means corresponds to the load of the driving member.

6. In combination as means for propelling automotive equipment, an internal combustion engine, a driving member and an intermediate member functionally connecting the engine and the driving member together, metering means responsive to changes in load on the driving member co-acting with the intermediate member to adjust the torque of the intermediate member, whereby under changes in load of the driving member the speed of the internal combustion engine is increased with increased load on the driving member.

7. In an automotive vehicle, a series motor to drive the vehicle, a generator to supply electric current to said motor, a prime mover to drive said generator, controlling means for the fluid propelling said prime mover and means for limiting the speed of said vehicle at any given setting of said controlling means.

8. In a drive system, a series motor receiving electric energy from a generator, a prime mover to drive said generator, controlling means for the fluid propelling said prime mover and means for adjusting the speed of said motor at any given setting of said controlling means, and at substantially constant value of motor field relative to motor armature.

9. In combination, a prime mover, a generator driven thereby, means forming an electrical load for receiving energy from said generator, means for supplying excitation current to said generator, a means for controlling the flow of said excitation current whereby as said electrical load increases the torque of said generator simultaneously decreases.

10. In apparatus of the character described, in combination, a prime mover, a generator drivably connected thereto, a motor connected to be supplied with energy from said generator, means forming a variable load and connected to be driven by said motor, a field on said generator, a relay for controlling said field whereby changes in said variable load the torque of the generator will simultaneously decrease with increase in load and increase with decrease in load.

11. The combination of a prime mover, a series motor subjected to a variable load, and an electric generator functionally connecting the prime mover and the motor together, means connecting the prime mover and electric generator together, and means on the electric generator responsive to changes in load of the motor member, whereby changes in load on the motor are transmitted to the prime mover and whereby the speed of the prime mover will so vary when the load is varied that the prime mover will so respond as to assume substantially all of the varied load over a considerable range of engine speed.

12. In an automotive vehicle, a series motor connected to drive said vehicle, a generator to supply electric energy to said motor, a prime mover connected to drive said generator, a field on said generator, means for controlling said generator field and responsive to changes in load on said motor and means for adjusting said controlling means whereby the speed of said vehicle may be adjusted while maintaining full load on the prime mover.

13. In an automotive vehicle, a series motor to drive the vehicle, a generator to supply electric current to said motor, a prime mover to drive said generator, and means for limiting the speed of said vehicle while maintaining full load on said prime mover, by increasing the torque of the generator.

14. In a drive system, a series motor, a generator to supply electric current to said motor, a prime mover to drive said generator, and means for limiting the speed of said motor while maintaining substantially full load on said prime mover, by increasing the torque of the generator.

15. In a drive system, a series motor receiving electric energy from a generator, a prime mover to drive said generator, and means for adjusting the speed of said motor while maintaining full load on the prime mover, and while maintaining substantially constant relative value of the motor field to motor armature, by increasing the torque of the generator.

16. In combination, a prime mover, an electric generator driven thereby, means forming an electrical load for receiving energy from said generator, means for supplying excitation current to said generator, means for controlling the excitation current supplied to said generator, and means responsive to changes in the power requirements of said electrical load for operating said controlling means, whereby on increase in electrical load the torque of said generator is reduced.

17. In combination, a prime mover, a generator driven thereby, means forming an electrical load for receiving energy from said generator, means for supplying excitation to said generator, and a regulating device for controlling said excitation, whereby as the load on the generator increases the speed of the prime mover increases.

18. In apparatus of the character described, in combination, a vehicle carrying a prime mover and a generator driven thereby, a series motor for driving said vehicle and supplied with energy from said generator, and means responsive to an increase in load on said motor operating to increase the speed of said prime mover.

19. In apparatus of the character described, in combination a vehicle carrying an internal combustion engine and a generator driven thereby, a motor for driving said vehicle and supplied with energy from said generator, controlling means responsive to an increase in load on said motor operating to increase the speed of said engine, and means for changing the standard of operation of said controlling means.

20. In combination a prime mover, a generator driven thereby, a field for said generator, a motor supplied with energy from said generator and controlling means for said field responsive to torque on said generator operating to increase the speed of said prime mover upon increase in motor load.

21. In an apparatus of the character described, in combination, a vehicle carrying a prime mover and a generator driven thereby, a series motor for driving said vehicle and supplied with energy from said generator, load responsive means operating to increase the speed of said prime mover on increase in load of said motor, and means for changing the standard of operation of said load responsive means.

22. In an apparatus of the character described, in combination, a prime mover and a generator driven thereby, a series motor for driving said vehicle and supplied with energy from said generator, and means responsive to an increase in load on said motor operating to simultaneously decrease the torque of said generator.

23. The combination of a prime mover, a driving member, and an intermediate member functionally connecting the prime mover and driving member together, and means substantially measuring the torque of said intermediate member operating to so adjust said torque of said intermediate member that as the load of the driving member increases the torque of the intermediate member simultaneously decreases.

24. In a power system, in combination, an internal combustion engine, a separately excited generator driven by the engine, said generator having field and armature windings and means responsive to the current flowing in the field and armature windings disposed to control the excitation of the generator to maintain decreased torque on the engine with increase of load on the generator.

25. In an automotive vehicle, a series motor to drive the vehicle, a generator to supply electric energy to said motor, a prime mover to drive said generator, a field on said generator, means controlling said generator field, means responsive to changes in speed of said vehicle and co-acting with said controlling means of said generator field whereby the speed of said vehicle is limited to any predetermined value.

HENRY ROSENTHAL.